United States Patent [19]

Wu

[11] Patent Number: 5,516,226

[45] Date of Patent: May 14, 1996

[54] WHEELCHAIR FRAME ASSEMBLY

[76] Inventor: Johnson Wu, NO. 52, Ching-Chien 3rd. Rd., Kuan-Yin Hsiang, Tao-Yuan Hsien, Taiwan

[21] Appl. No.: 297,828

[22] Filed: Aug. 30, 1994

[51] Int. Cl.6 .................................................. B62M 1/14
[52] U.S. Cl. ...................... 403/403; 280/250.1; 403/205; 403/382
[58] Field of Search ......................... 280/250.1; 403/205, 403/382, 403

[56] References Cited

U.S. PATENT DOCUMENTS

| | | | |
|---|---|---|---|
| 2,888,072 | 5/1959 | Nicholas | 403/205 X |
| 4,840,390 | 6/1989 | Lockard et al. | 280/250.1 |
| 5,049,005 | 9/1991 | Lazare et al. | 403/403 X |

FOREIGN PATENT DOCUMENTS 1038946  5/1953  France ................................. 403/205

Primary Examiner—Brian K. Green
Assistant Examiner—Andrea Chop
Attorney, Agent, or Firm—Bacon & Thomas

[57] ABSTRACT

A wheelchair frame assembly made by connecting a plurality of unit frames together, each unit frame consisting of a plurality of metal frame tubes and a plastic cover shell directly molded on the metal frame tubes, each metal frame tube having one end embedded in the plastic cover shell and an opposite end extended to the outside for coupling, the cover shell having a plurality of integral arm sections respectively bridged over each two adjacent metal frame tubes, a plurality of rod sections respectively fitted into the embedded end of each metal frame tube, and at least one coupling portion for connection to a respective coupling portion on the wheelchair.

1 Claim, 4 Drawing Sheets

WHEELCHAIR FRAME ASSEMBLY

BACKGROUND OF THE INVENTION

The present invention relates to a wheelchair frame assembly comprised of a plurality of unit frames detachably connected to one another with, each frame unit comprised of a plurality of metal frame tubes and a plastic shell directly molded on the metal frame tubes.

The frame of a regular wheelchair is made by welding a plurality of metal frame tubes into shape. The wheelchair frame structure has drawbacks. Because the metal frame tubes are connected together by welding, it is difficult to accurately fix the positions of the metal frame tubes relative to one another. The welding process will affect the structural strength of the metal frame tubes, and will cause the welded area to gather rust easily. Therefore, the frame must be electroplated after the process of welding. Further, the shapes and positions of the parts of the frame cannot be adjusted or changed after the process of welding.

SUMMARY OF THE INVENTION

The present invention has been accomplished to provide a wheelchair frame assembly which eliminates the aforesaid drawbacks. The wheelchair frame assembly is formed by detachably connecting a plurality of unit frames together without the application of welding. A unit frame consists of three metal frame tubes arranged in a substantially U-shaped configuration and a plastic shell directly molded on the metal frame tubes to hold them together. The plastic shell eliminates the process of electroplating, and can be made in desired colors to make the wheelchair frame assembly attractive. The plastic shell comprises integral arm sections respectively bridged over each of two adjacent metal frame tubes to reinforce tile connection, and integral rod sections are respectively fitted into one end of each metal frame tube to support them against compressive force.

DETAILED DESCRIPTION OF THE PREFERRED EMBODIMENT

Figure 5:
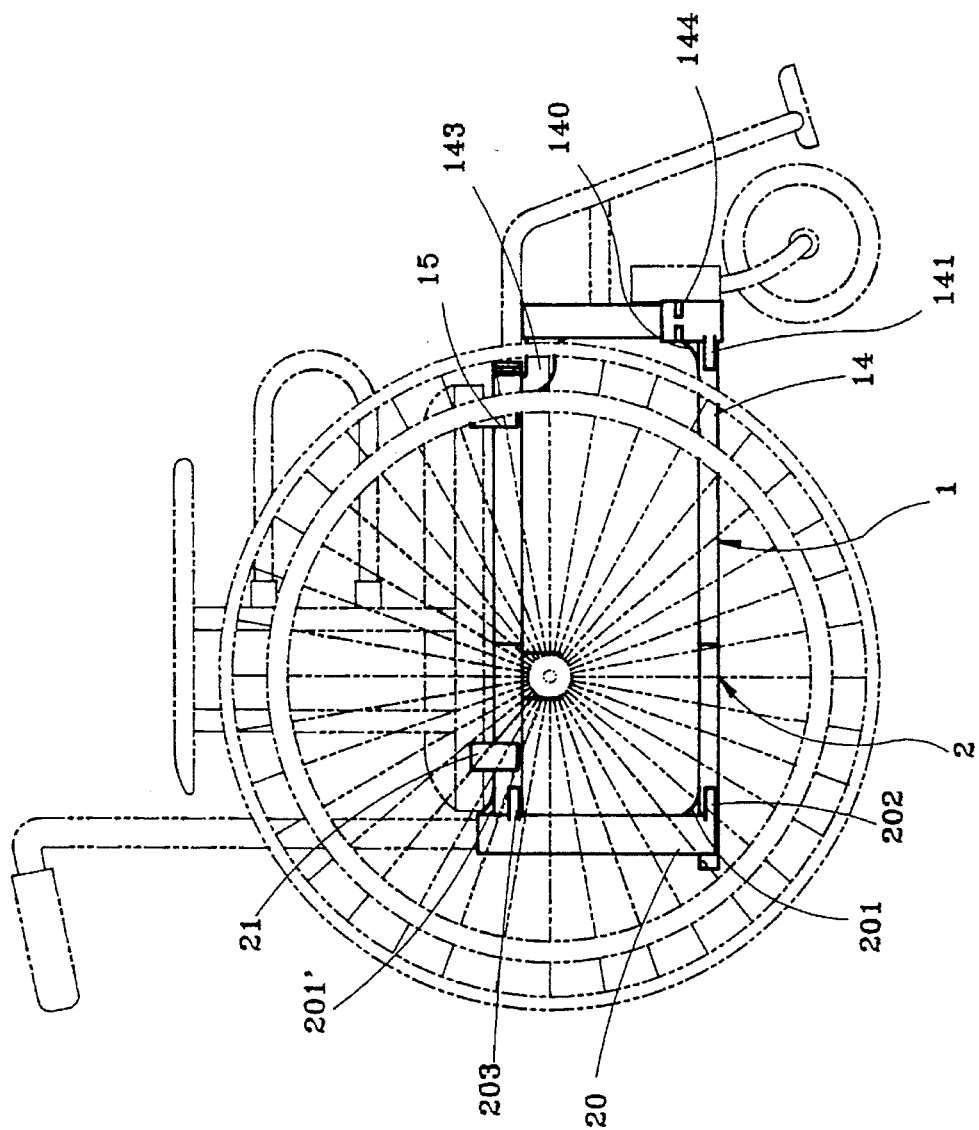
FIG. 5 is a plan view of a wheelchair constructed according to the present invention.

Referring to FIG. 5, the frame assembly of a wheelchair according to the present invention is made by connecting a plurality of unit frames 1 and 2 together.

Figure 1:
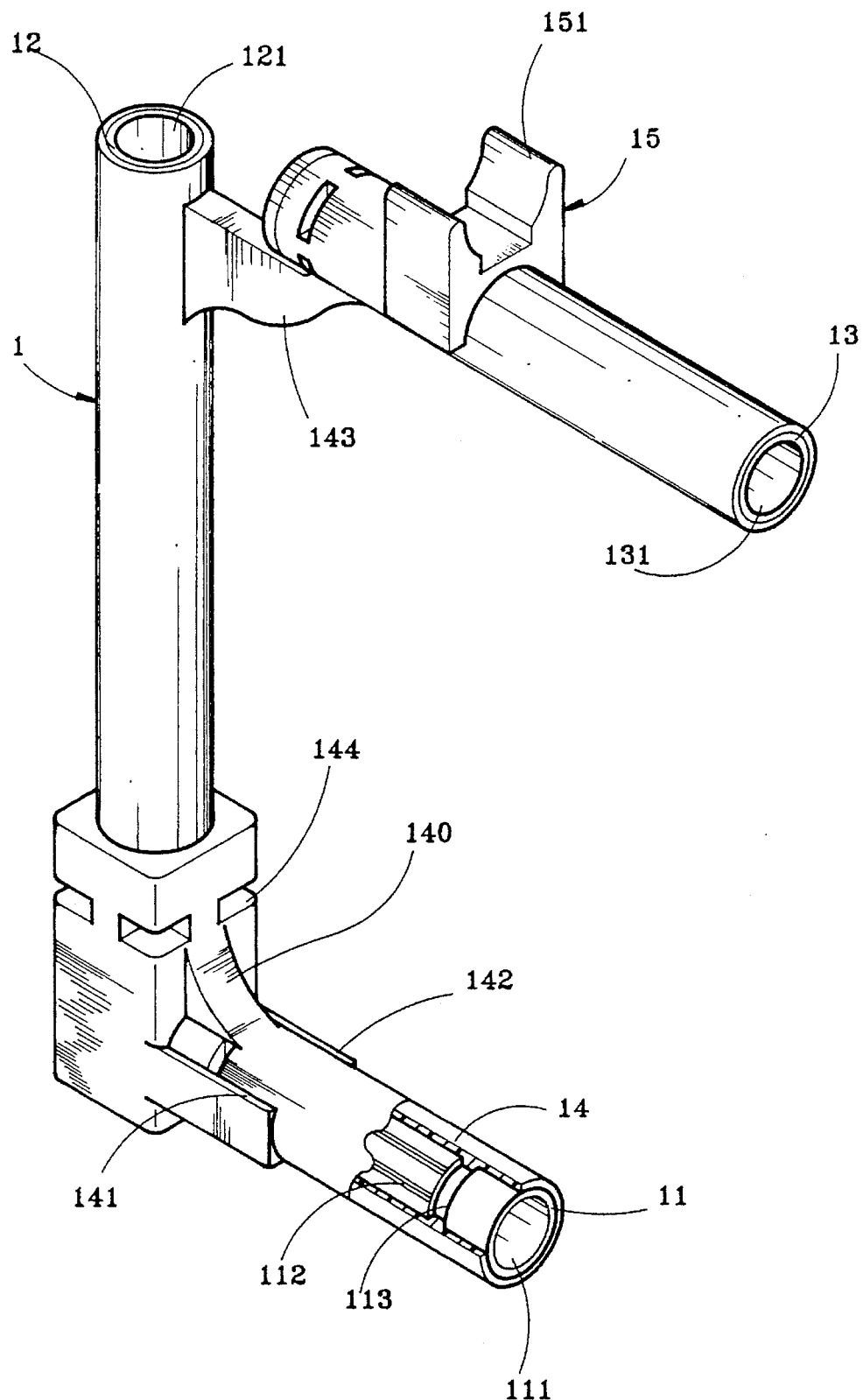
FIG. 1 is a perspective view of a unit frame according to the present invention.
Figure 3:
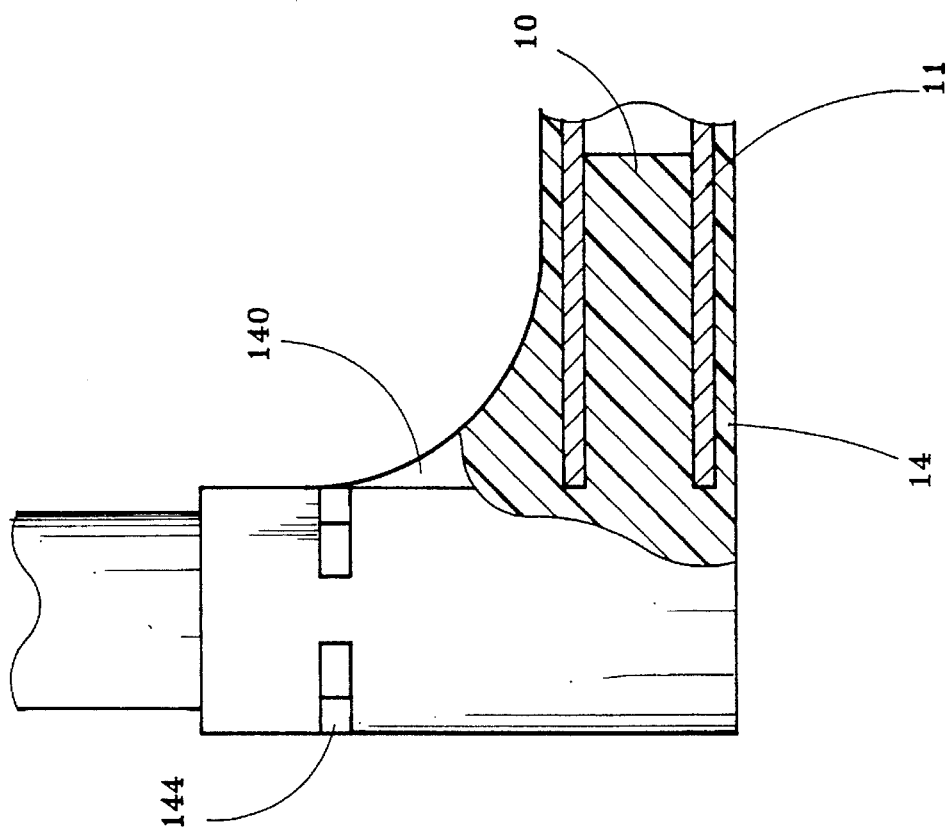
FIG. 3 is a partial view in section taken on FIG. 1 showing an integral rod section of the plastic cover shell fitted into one end of the first metal frame tube.

Referring to FIGS. 1 and 3, the unit frame 1 comprises a first metal frame tube 11, a second metal frame tube 12, a third metal frame tube 13, and a plastic cover shell 14. The cover shell 14 is directly molded on the metal frame tubes 11, 12 and 13 to hold them together. A plurality of integral arm sections 140, 141 and 142 are bridged over the first metal frame tube 11 and the second metal frame tube 12. An integral arm section 143 is bridged over the second metal frame tube 12 and the third metal frame tube 13. A plurality of rod sections 10 are fitted into the metal frame tubes 11, 12 and 13 (see FIG. 3), and a plurality of recessed holes 144 are provided at suitable locations to reinforce the structural strength of unit frame 1. At least one coupling portion 15 is provided for defining a bearing recess 151 for connection to the wheelchair. The metal frame tubes 11, 12 and 13 have each one end embedded in the plastic shell 14 and a respective opposite end 111, 121 and 131 exposed to the outside for mounting connecting shafts or like elements.

Figure 2:
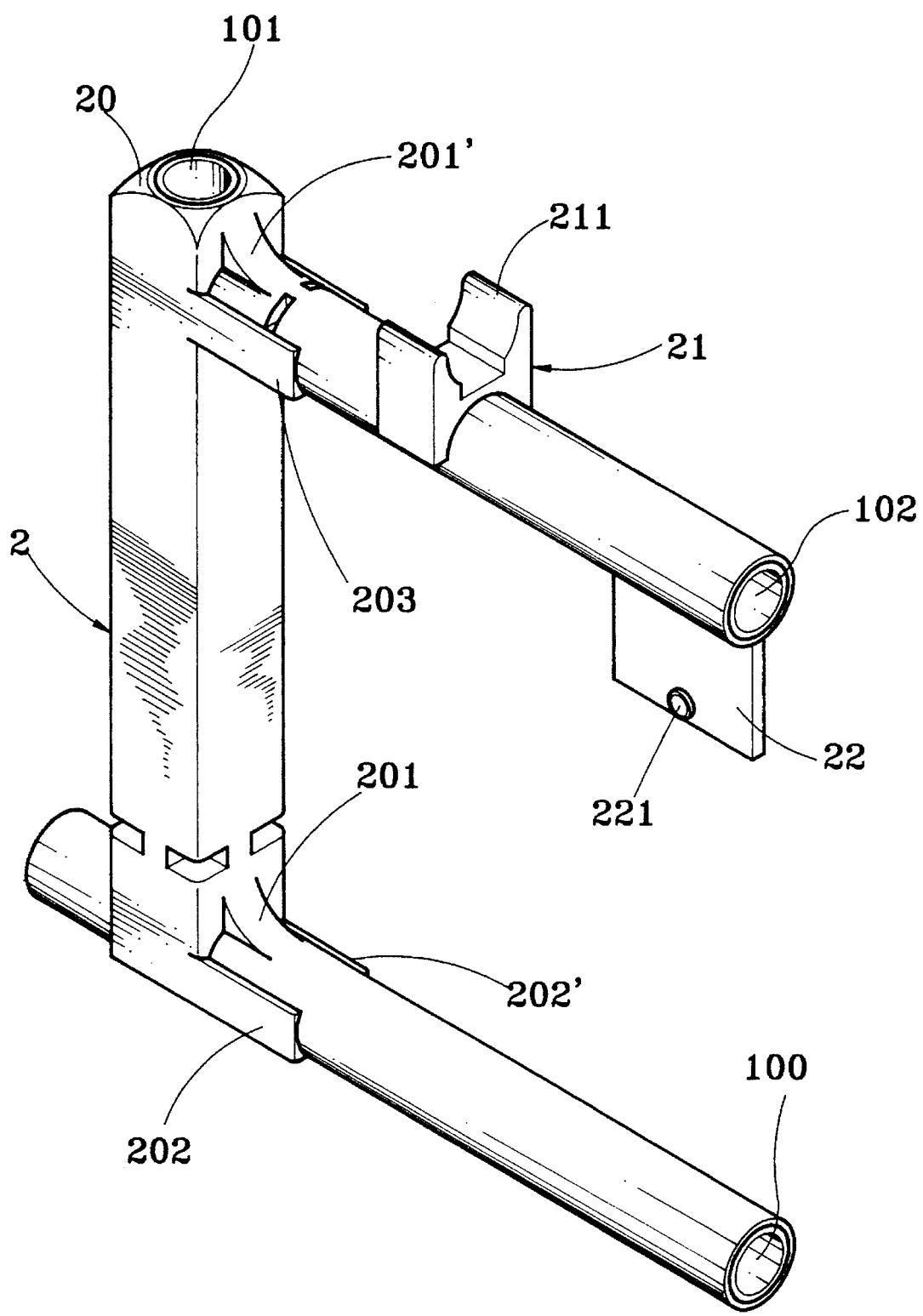
FIG. 2 is a perspective view of another unit frame according present invention.

The unit frame 2 shown in FIG. 2 also comprises three metal frame tubes 100, 101 and 102 and a plastic cover shell 20 directly molded on the metal frame tubes. The plastic cover shell 20 comprises integral arm sections 201, 201', 202, 202' and 203 respectively bridged over the metal frame tubes 100, 101 and 102 and at least one first coupling portion 21 with a bearing recess 211 and at least one second coupling portion 22 with a screw hole 221 for connection to other unit frames.

Figure 4:
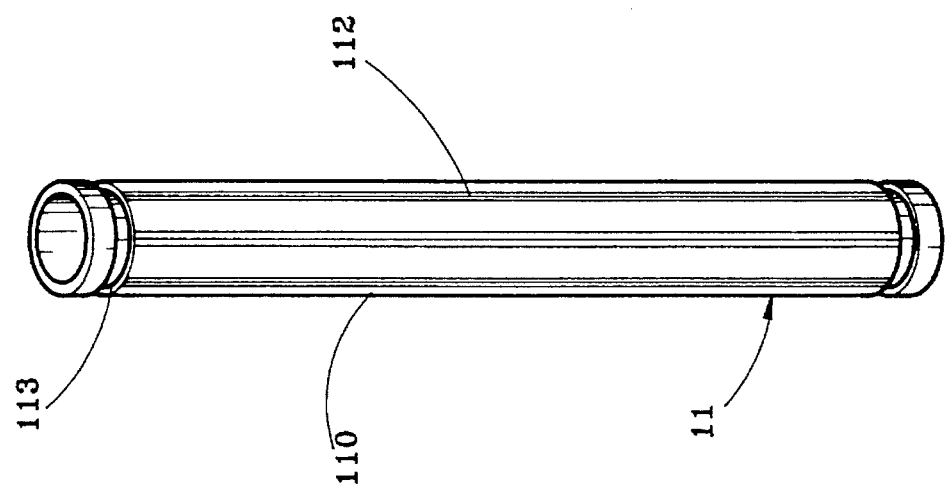
FIG. 4 is a perspective view of a metal frame tube according to the present invention.

Referring to FIG. 4, a metal frame tube 11, 12, 13 or 100, 101, 102, comprises two annular grooves 113 around the outside wall 110 near two opposite ends, and a plurality of longitudinal grooves 112 on the outside wall 110 between the annular grooves 113. During the process of molding the plastic cover shell 14 or 20 on the metal frame tubes 11, 12 and 13 or 100, 101, 102, the molten plastic fills up the annular grooves 113 and the longitudinal grooves 112. Therefore, when the plastic cover shell 14 or 20 is formed, it is prohibited from rotary motion relative to the frame tubes 11, 12, 13 or 100, 101, 102.

While only one embodiment of the present invention has been shown and described, it will be understood that various modifications and changes could be made without departing from the spirit and scope of the invention.

I claim:

1. A wheelchair frame assembly comprising a plurality of unit frames adapted to be connected together by a plurality of connecting elements, wherein each unit frame is comprised of a plurality of metal frame tubes and a plastic cover shell directly molded on said metal frame tubes for securing the tubes together, each metal frame tube halving two ends, one end being embedded in said plastic cover shell and an opposite end exposed from said plastic cover shell for mounting a connecting element thereto, each metal frame tube having a cylindrical outside wall, two annular grooves spaced around said cylindrical outside wall, one groove each near each of said ends thereof, and a plurality of longitudinal grooves connected between said annular grooves, said plastic cover shell covering over the outside wall of each metal frame tube and filling up said annular grooves and said longitudinal grooves, said plastic cover shell including a plurality of integral arm sections bridged over each two adjacent metal frame tubes, a plurality of rod sections fitted inside the embedded end of each metal frame tube, and at least one coupling portion for defining a bearing recess and connecting the unit frame to a respective coupling portion of the wheelchair.

* * * * *